Patented Mar. 5, 1929.

1,704,347

UNITED STATES PATENT OFFICE.

LEONARD SMIDTH, OF BROOKLYN, NEW YORK, ASSIGNOR TO EDWARD G. BUDD MANUFACTURING COMPANY, OF PHILADELPHIA, PENNSYLVANIA, A CORPORATION OF PENNSYLVANIA.

CONDENSATION PRODUCT OF FORMALDEHYDE AND UREA AND PROCESS OF MAKING THE SAME.

REISSUED

No Drawing. Application filed July 21, 1927, Serial No. 207,567. Renewed July 23, 1928.

My invention relates to a condensation product of formaldehyde and urea of a kind affording a number of different ways for working into articles of manufacture. Only formaldehyde, urea and thiourea need be used. The steps of the process after the initial reaction of the formaldehyde and urea involve mainly heat treatments by stages of progressively increased temperature, peculiarly related to each other.

According to my invention, slightly acid formalin (approximately 35% formaldehyde) is reacted with urea at a relatively low temperature, for example 25° to 50° C.

The mixture is subjected to vacuum distillation at a higher but intermediate temperature, below 100° C., preferably in a water bath. The greater part of the water accompanying the initial reaction of the formaldehyde and urea is removed by this distillation.

Then thiourea is added and in a third stage the solution subjected to vacuum distillation at a still higher temperature (for example, between 100° C. and 200° C., obtainable in an oil bath). The distillation is continued until nearly all the water is removed and the product is as viscous as possible, while yet in a condition to be cast. The thiourea may be added before the first distillation The reaction in these distillations, the latter especially, is particularly sensitive. The lower the temperature, the lower may be the vacuum, and vice versa. After distillation at highest temperatures (especially above 200° C.) the product should be cast under pressure, even relatively high pressure. In such case, the water may be removed to the same or even greater degree and yet the number and size of the bubbles reduced, so improving the transparency and clearness, decreasing the time of final heat treatment and ageing, and generally improving other qualities.

Upon the completion of the second distillation, the viscous product is cast by pouring it into a mold and permitting to cool. It becomes a hard and brittle, but comparatively soluble product. It is usually opalescent at this stage but, under the higher temperature and pressure conditions, may be transparent.

Thereupon the product is subjected to heat treatment at relatively high temperatures as compared to the temperatures of the initial reaction, say from 70° to 95° C. for a considerable period of time, two to four days. On the first application of the heat, the hard, brittle product is softened, becoming plastic, but as the heat is continued, it again hardens and ultimately is transformed into a fully transparent and clear, but tough, insoluble and infusible product.

A specific example is the following:

225 grams urea are dissolved in 640 cubic centimeters of 35% slightly acid formaldehyde (approximately $PH+5.2$). The solution is kept at 25° to 35° C. for approximately thirty minutes. Thereupon approximately thirty percent of the water present is removed by vacuum distillation. Then 63 grams of thiourea are added and the solution vacuum-distilled till as viscous as possible in an oil bath at 150° C. The solution is cast and permitted to cool. If the right conditions are obtained, the solution is clear on cooling. The clouded product is aged at 95° C. for three days and becomes clear.

Those skilled in the art will have no difficulty formulating other examples within the spirit of my invention.

Immediately after casting and cooling, the material is available for molding purposes. In its then brittle and soluble condition it may be ground or pulverized, mixed with suitable fillers, binding agents, modifiers, or the like, and molded. Application of appropriate temperature and pressure (according to the final step of my invention) to the mold will unify and clarify the product even to the extent of rendering it a homogeneous body and imparting perfect transparency. The ageing may be in or out of the mold.

The initial casting of course may be in the form of articles of manufacture. The aging heat of the final step of my process may be applied to the cast article just as in the case of the molded article, or in case of the material in bulk. The material may be cast or treated in sheet or other bulk form, and thereafter worked into article shape.

If desired, high temperature and high pressure immediately applied to the cast viscous solution can be used to speed the process past the cooling states, and rapidly through the brittle and the soft states to the tough final state.

Modifications of this invention within its generic spirit are quite as possible as of other inventions in the same field. The annexed claims are intended to include such modifications.

I claim:

1. A method of making condensation products of formaldehyde and urea consisting in reacting formaldehyde and urea at relatively low temperature, adding thiourea, and thereupon distilling out the water of the reaction at a relatively higher temperature.

2. The method of making condensation products of formaldehyde and urea consisting in reacting formaldehyde and urea at a temperature between 25 and 50 degrees C., adding thiourea, and thereupon removing the greater part of the water of the reaction at the relatively higher temperature between 50 and 100 degrees C.

3. A method of making condensation products of formaldehyde and urea consisting in reacting formaldehyde and urea at a relatively low temperature, adding thiourea, and removing the water of the reaction at a relatively higher temperature but in two stages, the greater part in a stage below 100 degrees C., and the lesser part in a stage above 100 degrees C.

4. The method of making condensation products of formaldehyde and urea consisting in reacting formaldehyde and urea at a temperature between 25 and 50 degrees C., adding thiourea, thereupon removing the greater part of the water of the reaction at the relatively higher temperature between 50 and 100 degrees C., and removing so much as possible of the water which remains by the further distillation between 100 and 200 degrees C.

5. A method of making condensation products of formaldehyde and urea consisting in reacting formaldehyde and urea at relatively low temperature, adding thiourea, and thereupon removing water of the reaction at a relatively higher temperature, and casting the product and permitting it to cool.

6. A method of making condensation products of formaldehyde and urea consisting in reacting formaldehyde and urea at relatively low temperature, adding thiourea, thereupon removing water of the reaction at a relatively higher temperature, and casting the product and permitting it to cool, and, finally, subjecting the cooled product to a heat treatment at relatively high temperature.

7. The method of making condensation products of formaldehyde and urea consisting in reacting formaldehyde and urea at a temperature between 25 and 50 degrees C., adding thiourea, thereupon removing the greater part of the water of the reaction at a relatively higher temperature between 50 and 100 degrees C., removing so much as possible of the water which remains by the further distillation between 100 and 200 degrees C., casting and cooling the product, and finally, subjecting it to a heat treatment between 70 and 95 degrees C. for from two to four days.

8. A method of making condensation products of formaldehyde and urea consisting in reacting formaldehyde and urea at a relatively low temperature, adding thiourea, removing the greater part of the water of the reaction at a temperature below the usual boiling point and removing so much as possible of the remainder under a relatively high temperature and high pressure.

9. A product of formaldehyde and urea containing formaldehyde, urea and thiourea reacted in substantially the following proportions; 225 grams of urea dissolved in 640 cubic centimeters or 35% formaldehyde (PH+5.2) at from 25 to 30 degrees C. for thirty minutes from which 30% of the water present is removed by vacuum distillation below the boiling point of the solution at ordinary pressures to which 63 grams of thiourea has been added and the solution vacuum-distilled at temperatures considerably above the usual boiling point until of as great viscosity as possible permitting casting, and which has been cast at this stage.

10. A product of formaldehyde and urea containing formaldehyde, urea and thiourea reacted in substantially the following proportions: 225 grams of urea dissolved in 640 cubic centimeters or 35% formaldehyde (PH+5.2) at from 25 to 30 degrees C. for thirty minutes from which 30% of the water present is removed by vacuum distillation below the boiling point of the solution at ordinary pressures to which 63 grams of thiourea has been added and the solution vacuum-distilled at temperatures considerably above the usual boiling point until of as great viscosity as possible permitting casting, and which has been cast at this stage, and subjected to final heat treatment between 70 and 95 degrees C. for two or three days.

In testimony whereof he hereunto affixes his signature.

LEONARD SMIDTH.